(12) United States Patent
Liu et al.

(10) Patent No.: US 7,973,503 B2
(45) Date of Patent: Jul. 5, 2011

(54) MOTOR SYSTEM EMPLOYING ANALOG ENCODED HALL EFFECT SENSOR POSITION INFORMATION FOR REDUCED WIRING

(75) Inventors: Raymond Y. Liu, Monterey Park, CA (US); Estella C. Chung, West Hills, CA (US)

(73) Assignee: Wooward HRT, Inc., Santa Clarita, CA (US)

( * ) Notice: Subject to any disclaimer, the term of this patent is extended or adjusted under 35 U.S.C. 154(b) by 680 days.

(21) Appl. No.: 11/768,475

(22) Filed: Jun. 26, 2007

(65) Prior Publication Data

US 2009/0001966 A1    Jan. 1, 2009

(51) Int. Cl.
*H02K 29/08* (2006.01)

(52) U.S. Cl. ............. 318/400.38; 318/400.37; 318/604; 324/207.2

(58) Field of Classification Search ............. 318/400.37, 318/400.38; 324/207.2
See application file for complete search history.

(56) References Cited

U.S. PATENT DOCUMENTS

| | | | |
|---|---|---|---|
| 5,291,133 A | | 3/1994 | Gokhale et al. |
| 5,767,639 A | * | 6/1998 | Sakaguchi et al. ........ 318/400.11 |
| 5,963,706 A | * | 10/1999 | Baik ............................ 388/804 |
| 6,509,710 B2 | * | 1/2003 | Grasso et al. ................. 318/701 |
| 6,918,688 B2 | * | 7/2005 | Ishida ............................ 362/467 |
| 7,009,360 B2 | * | 3/2006 | Jin-woo et al. ............. 318/254.1 |
| 7,026,773 B2 | | 4/2006 | Petersen |
| 7,194,321 B2 | * | 3/2007 | Sun et al. .................. 318/400.01 |
| 7,274,163 B1 | * | 9/2007 | Lambert et al. .......... 318/400.12 |
| 7,423,394 B2 | * | 9/2008 | Collins ...................... 318/400.01 |
| 2004/0250630 A1 | | 12/2004 | Yao | |

FOREIGN PATENT DOCUMENTS

JP    2004274948 A    9/2004

OTHER PUBLICATIONS

International Search Report from PCT/US2008/058895, mailed Sep. 3, 2008.
Written Opinion from PCT/US2008/058895, mailed Sep. 3, 2008.

* cited by examiner

*Primary Examiner* — Walter Benson
*Assistant Examiner* — David S Luo
(74) *Attorney, Agent, or Firm* — BainwoodHuang

(57) ABSTRACT

A system has a sensor assembly mounted adjacent to a moving magnetic member such as a motor rotor to sense its position. The sensor assembly includes Hall-effect sensors each having a binary output, configured such that distinct positions of the moving magnetic member correspond to distinct digital patterns of the outputs of the Hall-effect sensors. Encoding circuitry is coupled to the outputs of the Hall-effect sensors to generate a multi-valued analog output, distinct values of the multi-valued analog output representing corresponding distinct digital patterns of the outputs of the Hall-effect sensors. The encoding circuitry may employ a ladder network with weighted-value resistors contributing different components of an analog current sensed by the controller. The sensed current can be converted to digital position information using suitable analog-to-digital conversion circuitry. The multi-valued analog output can be conveyed on a single wire in contrast to the prior art which requires one wire per Hall-effect sensor.

16 Claims, 2 Drawing Sheets

MOTOR SYSTEM EMPLOYING ANALOG ENCODED HALL EFFECT SENSOR POSITION INFORMATION FOR REDUCED WIRING

BACKGROUND

The present invention relates to the field of motor position sensing using Hall-effect sensors.

It is common to utilize Hall-effect sensors to detector the rotational position of a motor such as a brushless DC motor. In one common configuration, three or more Hall-effect sensors are mounted to the stator of the motor within the magnetic field of the rotor magnet which rotates during motor operation. The Hall-effect sensors generate binary outputs that provide rotational position information to control circuitry that controls the speed and/or position of the motor, including "commutation" or the sequencing of the currents provided to different windings of the motor.

In such configurations, it is known to employ individual wires to carry the output signal from each Hall-effect sensor. Thus in an application having three Hall-effect sensors, for example, typically at least five wires are required to generate the Hall-effect output signals and carry them to the controller—two power supply wires (Hall excitation and return) and three wires for carrying the respective outputs of the Hall-effect sensors.

SUMMARY

There is a need in some applications for greater efficiency in the way that the outputs of Hall-effect sensors are provided to control circuitry. For example, many modern motors are of very small size (e.g., less than ½" in diameter) and thus there is very little space adjacent to the motor for the Hall-effect sensors and the termination of a large number of wires. In other applications, the wires running between the motor and the controller may cover an appreciable distance and thus consume excessive space and/or weight, especially in applications that are sensitive to these requirements such as space or aeronautic applications. Other problems experienced in the conventional approach include the cost and complexity of a wiring harness employed to provide the connections between the motor and the controller, and the possible adverse effects of noise on the output signals due to the relatively high output impedance of the Hall-effect sensors.

A system is disclosed which has reduced wiring requirements by employing analog-encoded Hall-effect sensor position information. In one embodiment the system is a motor system, but more generally the disclosed technique can be utilized in systems in which the position of a moving magnetic member is sensed and position information is generated and sent to a controller. A sensor assembly is mounted immediately adjacent to the moving magnetic member to sense its position. The sensor assembly includes a number of Hall-effect sensors each having a binary output, wherein the Hall-effect sensors are configured such that distinct positions of the moving magnetic member correspond to distinct digital patterns of the set of outputs of the Hall-effect sensors. In one configuration, three Hall-effect sensors are employed, and thus the digital patterns are selected from among three-bit numbers such as 001, 010, etc. Each of these patterns represents a corresponding position of the magnetic member.

Encoding circuitry coupled to the outputs of the Hall-effect sensors generates a multi-valued analog output of the sensor assembly, wherein each distinct value of the multi-valued analog output represents a corresponding one of the distinct digital patterns of the outputs of the Hall-effect sensors. In one embodiment, this encoding circuitry employs a ladder network with weighted-value resistors that contribute different components of an overall analog current that is sensed by the controller. The sensed current can be converted back to digital position information using suitable analog-to-digital conversion circuitry. The multi-valued analog output can be conveyed on a single wire, in contrast to the prior art which requires one wire per Hall-effect sensor, and thus the costs and other drawbacks of the additional wires are avoided.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
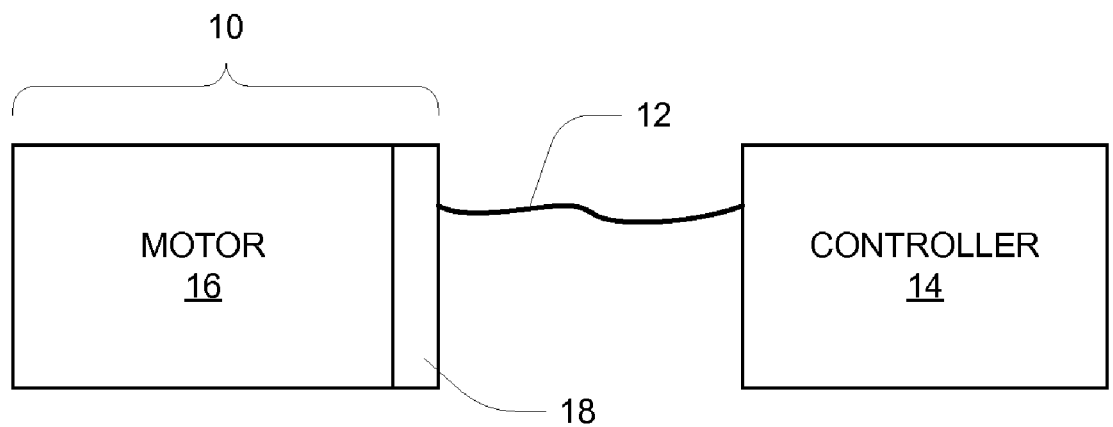
FIG. 1 is a block diagram of a system having a motor, sensor assembly and controller in accordance with an embodiment of the present invention.

FIG. 1 shows a system having a motor assembly 10 coupled by a wiring harness 12 to a controller 14. The motor assembly 10 includes a motor 16 such as a brushless DC motor, and a sensor assembly 18 affixed to one end of the motor 16. One end of the wiring harness 12 terminates on the sensor assembly 18.

The controller 14 controls the operation of the motor 10, specifically its rotational position and/or speed depending on the application. In one application, the motor 16 is part of an electromagnetic actuator utilized to control the position of a mechanical component, such as in an aircraft. The controller 14 monitors the rotational position of the motor 14 via Hall-effect sensors located on the sensor assembly 18 (as described below), and controls the flow of current to the windings of the motor 16 to achieve a desired motor position and/or speed for a desired actuator movement. Different types of motor control arrangements and techniques may be utilized in different embodiments, including specific circuitry for controlling winding currents. The present description is primarily concerned with the communication of motor position information from motor-mounted sensors (such as on sensor assembly 18) to separate controllers such as controller 14.

Figure 2:
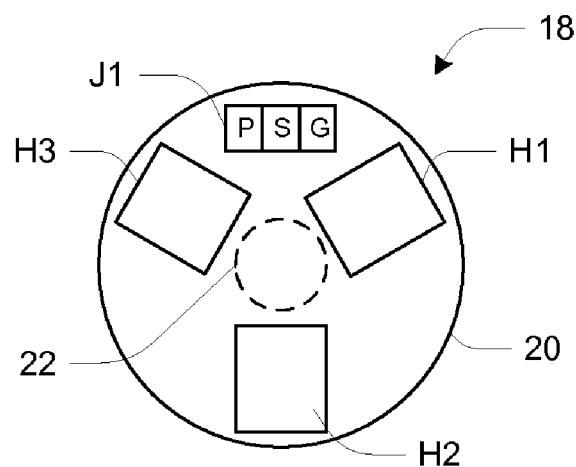
FIG. 2 is a schematic mechanical diagram of a sensor assembly.

FIG. 2 shows an example mechanical layout of the sensor assembly 18. Three Hall-effect sensors H1, H2 and H3 are arranged around a disk-shaped circuit board 20, which also includes a set of three terminations J1 for three wires of the wiring harness 12, the individual terminations being labeled P, S and G respectively. These are explained below. The dotted line 22 represents other circuitry that may reside on the circuit board 20 (which need not be limited to the central area of the circuit board 20), such as discrete and/or integrated electronic components, examples of which are described below.

As is generally known in the art, it is advantageous to utilize multiple Hall-effect or other position sensors and arrange them at different angular positions to achieve corresponding partial indications of motor position, and then to utilize the outputs of all the sensors to obtain more complete position information. The position information can be used, among other things, to effect electronic commutation in DC brushless motors, to control the position of a mechanical component actuated by the motor, etc. In many applications, such as some motor commutation applications for example, it may be sufficient to utilize as few as three Hall-effect sensors as shown in FIG. 2. As described briefly below, a set of three Hall-effect sensors can accurately indicate when commutation should occur, but otherwise provides a relatively coarse indication of motor position. In other applications it may be desirable to utilize more sensors in order to obtain finer-grain position information for example.

Using prior approaches, it is necessary to utilize a separate wire for each Hall-effect sensor in order to communicate its binary output to a controller, and the controller interprets the set of binary outputs of all the Hall-effect devices to obtain overall motor position information. Thus in a system using three Hall-effect sensors, for example, a minimum of five wires are necessary between the set of sensors and the controller, two of which are for power and three of which are for signaling the respective output states of the Hall-effect sensors. Each wire consumes space, including the space required to terminate the wire (such as a terminal jack) at the motor, and also adds to the weight of the overall motor-controller system. As motors have become smaller and lighter, the space and weight consumed by the wires is proportionally greater. In certain applications (such as aeronautic or space applications), it is desired to reduce the space and weight utilized solely to communicate motor position information to a controller.

Figure 3:
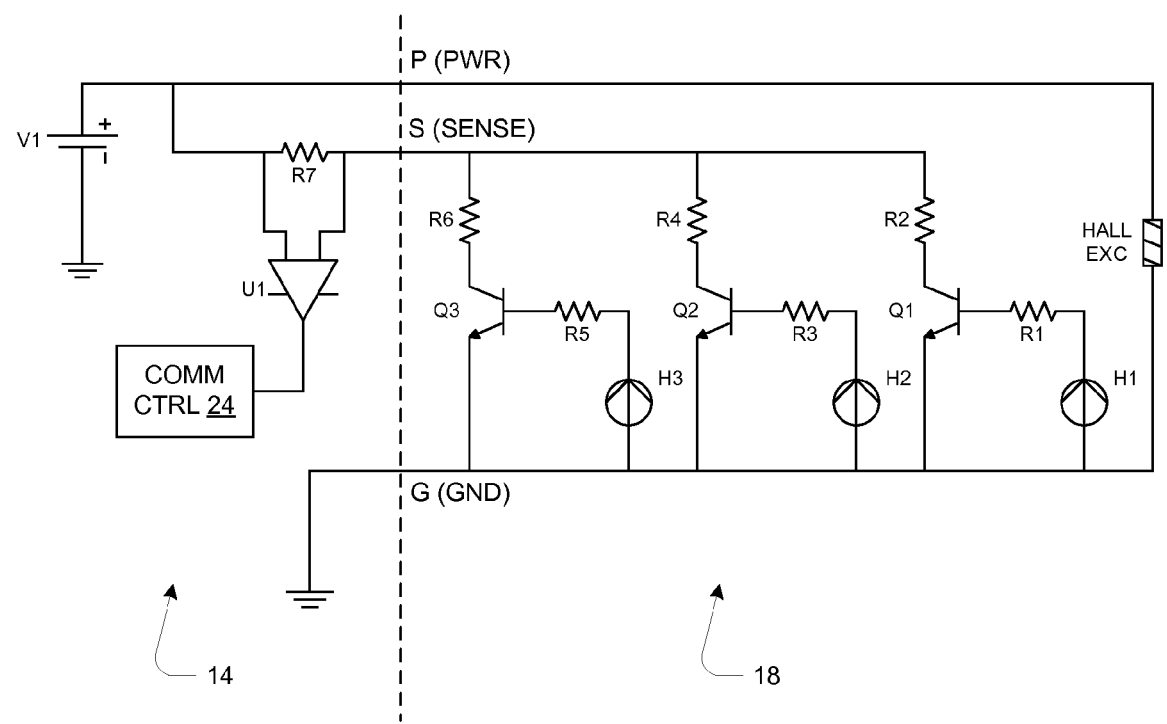
FIG. 3 is a schematic electrical diagram of a sensor assembly.

FIG. 3 is a schematic diagram of the sensor assembly 18 and pertinent components of the controller 14.

The three connections provided by the wiring harness 12 and set of terminations J1 (FIGS. 1-2) are shown as P for power (PWR), S for sense (SENSE), and G for ground (GND).

The controller 14 includes a power source V1 as well as a sense resistor R7, amplifier U1 and commutation control circuitry (COMM CTRL) 24. The sensor assembly 18 includes the Hall-effect sensors H1-H3, transistors Q1-Q3, and resistors R1-R6 as shown. The overall structure of the circuitry of the sensor assembly 18 is a "ladder" structure, with each "rung" or "leg" of the ladder including a corresponding Hall-effect sensor and its associated transistor and resistors (e.g., the set H1, Q1, R1 and R2 in leg 1). Also shown is the excitation (HALL EXC) for the Hall-effect sensors, which although shown for simplicity as a single element will be understood to actually corresponding to three distinct elements, one for each Hall-effect sensor.

The values of the resistors R2, R4 and R6 are chosen according to a weighting scheme that effects an encoding of the pattern of binary states of the Hall-effect sensors H1-H3 into a corresponding multi-valued analog signal (which is a current in the illustrated embodiment). For example, the values (R2:R4:R6) might have the ratios (1:2:4) to effect a binary weighting scheme such that the ratios of current through the transistors (Q1:Q2:Q4) when conducting is (4:2:1). The sum of these individual current components (which forms the multi-valued analog signal) passes through the sense resistor R7. In one common use of three Hall-effect sensors, the set of binary Hall outputs reflects six different position values. The following table illustrates these values and the corresponding values of the sense current (arbitrary units) conducted through the sense resistor R7:

| Position (electrical degrees) | H3 | H2 | H1 | Sense Current |
|---|---|---|---|---|
| 0 | 0 | 0 | 1 | 1 |
| 60 | 1 | 0 | 1 | 5 |
| 120 | 1 | 0 | 0 | 4 |
| 180 | 1 | 1 | 0 | 6 |
| 240 | 0 | 1 | 0 | 2 |
| 300 | 0 | 1 | 1 | 3 |

As noted above, the transitions between adjacent Hall states (e.g., 001→101) occur at precise points and can thus be used to effect commutation. Beyond that, each Hall state itself provides relatively coarse position information (e.g., within one 60-degree section).

The sense resistor R7 converts the sense current to a corresponding voltage, which is amplified by amplifier U1 and then provided to the commutation control circuitry 24. Typically, the commutation control circuitry 24 will include some form of analog-to-digital conversion circuitry to convert the analog position information conveyed by the analog voltage signal from U1 into binary digital values that are then utilized to effect commutation.

Although the above description employs three Hall-effect sensors and corresponding circuitry and position values, it will be appreciated that the techniques disclosed herein can be utilized (with suitable modification) in conjunction with a larger number of Hall-effect sensors, which may be desirable in alternative embodiments. Additionally, because the disclosed techniques utilizing fewer wires may reduce the amount of space or weight needed to communicate motor position information to a controller, the disclosed techniques may be especially useful in applications that are sensitive to such space/weight requirements and/or that require more Hall-effect sensors for greater precision in the position information. With respect to space/weight requirements, the disclosed techniques may be especially useful with motors having a diameter of less than one-half inch for example.

While various embodiments of the invention have been particularly shown and described, it will be understood by those skilled in the art that various changes in form and details may be made therein without departing from the spirit and scope of the invention as defined by the appended claims.

What is claimed is:

1. Apparatus, comprising:
   a moving magnetic member; and
   a sensor assembly mounted immediately adjacent to the moving magnetic member to sense the position thereof, the sensor assembly including:
      a plurality of Hall-effect sensors each having a binary output, the Hall-effect sensors being configured such that distinct positions of the moving magnetic member correspond to distinct digital patterns of the set of outputs of the Hall-effect sensors; and
      encoding circuitry coupled to the outputs of the Hall-effect sensors, the encoding circuitry being operative to generate a multi-valued analog output of the sensor assembly, each distinct value of the multi-valued analog output representing a corresponding one of the distinct digital patterns of the set of outputs of the Hall-effect sensors.

2. Apparatus according to claim 1 wherein the multi-valued analog output of the sensor assembly comprises a current output, and wherein the encoding circuitry comprises a ladder network having ladder sections each coupled to a respective one of the Hall-effect sensors, the ladder sections including respective weighting resistors operative to establish respective components of the current output of the sensor assembly.

3. Apparatus according to claim 1 wherein the encoding circuitry comprises a plurality of transistor amplifiers having respective inputs coupled to respective ones of the Hall-effect sensors and having respective outputs coupled together to generate the multi-valued analog output of the sensor assembly.

4. Apparatus according to claim 1 wherein the moving magnetic member comprises a rotor of an electric motor, and wherein the Hall-effect sensors of the sensor assembly are configured such that the distinct digital patterns of the set of outputs of the Hall-effect sensors correspond to distinct rotational positions of the moving magnetic member.

5. Apparatus according to claim 4 wherein the electric motor has a diameter of less than approximately one-half inch.

6. Apparatus according to claim 1 further comprising a wiring harness providing the coupling between the sensor assembly and the controller, the wiring harness including first and second wires carrying supply current and a third wire carrying the multi-valued analog output of the sensor assembly.

7. Apparatus according to claim 1 wherein the sensor assembly comprises a circuit board on which the Hall-effect sensors and the encoding circuitry are mounted.

8. Apparatus, comprising:
the apparatus of claim 1; and
a controller coupled to receive the analog output of the sensor assembly and to utilize the position information provided by the distinct values of the analog output to control the operation of the moving magnetic member.

9. Apparatus according to claim 8 wherein:
the multi-valued analog output of the sensor assembly comprises a current output;
the encoding circuitry comprises a resistor ladder network having ladder sections each coupled to a respective one of the Hall-effect sensors, the ladder sections including respective weighting resistors operative to establish respective components of the current output of the sensor assembly; and
the controller includes:
a sense resistor coupled to the resistor ladder network to develop an analog voltage corresponding to the current output of the sensor assembly; and
conversion circuitry operative to convert the analog voltage into a corresponding digital value used by digital control circuitry of the controller to control the operation of the moving magnetic member.

10. Apparatus according to claim 1, wherein the moving magnetic member comprises a rotor of an electric motor, and wherein the sensor assembly includes a disk-shaped circuit board on which the Hall-effect sensors and the encoding circuitry are disposed, the disk-shaped circuit board being disposed at one end of the electric motor and having a center portion in which the encoding circuitry is located and about which the Hall-effect sensors are symmetrically arranged.

11. Apparatus according to claim 10, wherein the disk-shaped circuit board further includes a connector for coupling to a wiring harness providing connections between the disk-shaped circuit board and a controller, the connections including one connection for carrying the multi-valued analog output to the controller, the connector being located between a pair of the Hall-effect sensors.

12. Apparatus according to claim 11, wherein the connector includes a set of only three terminations for three wires of the wiring harness, the three terminations including two terminations for receiving power from the controller and a third termination for providing the multi-valued analog signal to the controller.

13. Apparatus, comprising:
a moving magnetic member; and
a sensor assembly mounted immediately adjacent to the moving magnetic member to sense the position thereof, the sensor assembly including:
a plurality of Hall-effect sensors each having a binary output, the Hall-effect sensors being configured such that distinct positions of the moving magnetic member correspond to distinct digital patterns of the set of outputs of the Hall-effect sensors; and
encoding circuitry coupled to the outputs of the Hall-effect sensors, the encoding circuitry being operative to generate a multi-valued analog output of the sensor assembly, each distinct value of the multi-valued analog output representing a corresponding one of the distinct digital patterns of the set of outputs of the Hall-effect sensors,
wherein the multi-valued analog output of the sensor assembly comprises a current output, and wherein the encoding circuitry comprises a ladder network having ladder sections each coupled to a respective one of the Hall-effect sensors, the ladder sections including respective weighting resistors operative to establish respective components of the current output of the sensor assembly.

14. Apparatus according to claim 13 wherein the encoding circuitry comprises a plurality of transistor amplifiers having respective inputs coupled to respective ones of the Hall-effect sensors and having respective outputs coupled together to generate the multi-valued analog output of the sensor assembly.

15. Apparatus, comprising:
the apparatus of claim 13; and
a controller coupled to receive the analog output of the sensor assembly and to utilize the position information provided by the distinct values of the analog output to control the operation of the moving magnetic member.

16. Apparatus according to claim 15 wherein the controller includes:
a sense resistor coupled to the resistor ladder network to develop an analog voltage corresponding to the current output of the sensor assembly; and
conversion circuitry operative to convert the analog voltage into a corresponding digital value used by digital control circuitry of the controller to control the operation of the moving magnetic member.

* * * * *